United States Patent [19]

Mouri

[11] 4,262,313
[45] Apr. 14, 1981

[54] BIAS CURRENT SETTING APPARATUS IN A MAGNETIC RECORDING AND REPRODUCING APPARATUS

[75] Inventor: Tomohiro Mouri, Musashino, Japan

[73] Assignee: Victor Company of Japan Ltd., Yokohama, Japan

[21] Appl. No.: 16,738

[22] Filed: Mar. 2, 1979

[30] Foreign Application Priority Data

Mar. 6, 1978 [JP] Japan ................... 53-24505

[51] Int. Cl.³ .................... G11B 5/47; G11B 27/36
[52] U.S. Cl. ........................... 360/66; 360/25; 360/31
[58] Field of Search .................... 360/25, 31, 66

[56] References Cited

U.S. PATENT DOCUMENTS

| | | | |
|---|---|---|---|
| 2,791,640 | 5/1957 | Wolfe | 360/25 |
| 3,798,673 | 3/1974 | Koinuma | 360/66 |
| 3,947,875 | 3/1976 | Bull et al. | 360/25 |
| 4,011,585 | 3/1977 | Sunaga | 360/25 |
| 4,038,692 | 7/1977 | Umede et al. | 360/25 |
| 4,092,678 | 5/1978 | Nishikawa | 360/66 |

*Primary Examiner*—Vincent P. Canney
*Attorney, Agent, or Firm*—Haseltine and Lake

[57] ABSTRACT

A bias current setting apparatus is used in a magnetic recording and reproducing apparatus having a bias current supplying circuit and a magnetic head for recording an audio signal with the bias current on a magnetic tape. The bias current setting apparatus comprises an oscillator for oscillating signals of different frequencies, said signals of different frequencies being recorded and reproduced on and from the magnetic tape in the magnetic recording and reproducing apparatus, a circuit for varying the current value of the bias current, a first detector for detecting the signal of different frequencies which have been recorded and reproduced, a filter for separating a harmonic component of the signal of a frequency which have been recorded and reproduced, a second detector for detecting the output signal of the filter a converter for converting the output signals of the first and second detector which have been selectively supplied thereto into digital signals, and a computer for controlling the bias current setting circuit with a stored program system responsive to the digital signals supplied from the converter thereby varying the bias current value and setting the same at a current value appropriate to the recording on the magnetic tape. The computer varies and sets the bias current value so that the levels of the signals of different frequencies detected by the first detector fall within the predetermined frequency characteristic specification range and distortion factor measured responsive to the output signals of the first and second detectors falls within the predetermined distortion factor characteristic specification range.

6 Claims, 5 Drawing Figures

BIAS CURRENT SETTING APPARATUS IN A MAGNETIC RECORDING AND REPRODUCING APPARATUS

BACKGROUND OF THE INVENTION

The present invention relates generally to bias current setting apparatuses in magnetic recording and reproducing apparatuses. More particularly, the invention relates to an apparatus which automatically sets the bias current which is most suitable for recording on a magnetic recording medium used in a magnetic recording and reproducing apparatus.

In recent years, much progress has been made in research on and development of magnetic materials for magnetic tapes, and various kinds of magnetic tapes are being sold on the market. For example, there are at present magnetic tapes of classes called normal tapes, which have existed for some time, ferrichrome tapes, chrome tapes, and metal tapes, this classification being by the kind of magnetic material. These various kinds of tapes, however, have respectively different characteristics, whereby the most suitable bias current values for recording audio signals on these tapes are also respectively different. Furthermore, even among tapes of the same kind, the most suitable bias current value differs also depending on differences such as difference in thickness of the magnetic medium and differnce in the state of contact between the magnetic head and the tape.

For this reason, in order to accomplish good recording on a tape being used by causing that tape to amply exhibit its characteristics, irrespective of the kind of that tape, the bias current value most suitable for recording on that tape being used must be variably set.

Accordingly, there has heretofore been a system wherein the bias current is variably set by recording a signal of a specific frequency, thereafter reproducing this signal, operating a servo-motor in response to the level of the resulting reproduced output, and driving a variable resistor by means of the servo-motor. However, since a mechanical system is used in this known device, there arise problems when devices for purposes such as distortion factor and recording reference level correction are added, examples of such problems being the elaborate scale and nature of the entire device, high price, and the requirement of a long time for setting the most suitable bias current value.

SUMMARY OF THE INVENTION

It is a general object of the present invention to provide a novel and useful bias current setting apparatus in a magnetic recording and reproducing apparatus in which the above described problems accompanying known device of like kind have been overcome.

Another and specific object of the invention is to provide a bias current setting apparatus for automatically setting the bias current value most suitable for recording a signal on a magnetic tape, which is used in a magnetic recording and reproducing apparatus, in accordance with that magnetic tape.

Still another object of the invention is to provide a bias current setting apparatus which, by using a microcomputer, measures the frequency characteristic, the distortion factor characteristic, and other characteristics in accordance with a magnetic tape used in a magnetic recording and reproducing apparatus and automatically so sets the bias current value that the values of these characteristics thus measured respectively fall within prescribed specifications.

Other objects and further features of the invention will be apparent from the following detailed description when read in conjunction with the accompanying drawings.

DETAILED DESCRIPTION

Figure 1:
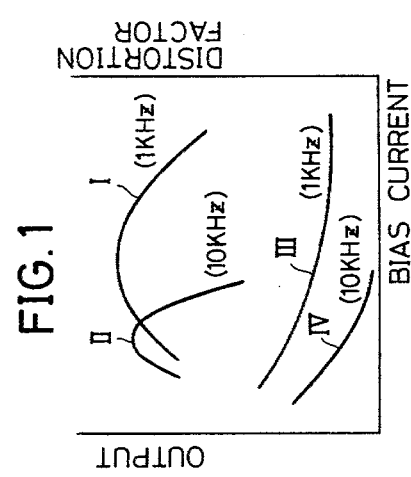
FIG. 1 is a graph indicating reproduction output level characteristics and distortion factor characteristics with respect to bias current value.

In general, in the case where a signal is recorded in a tape recorder as a bias is applied, and this recorded signal is reproduced, the relationships between the bias current value versus the level and the distortion factor of the reproduced signal are as indicated in FIG. 1. In the case where the frequency of the recorded and reproduced signal is 1 KHz, the reproduced signal level, as indicated by curve I, increases with the bias current up to a certain current value but conversely decreases as the current value increases further. The distortion factor in this case, as indicated by curve III, decreases with increase of the bias current value.

In the case where the frequency of the recorded and reproduced signal is 10 KHz, the reproduced signal level, as indicated by curve II, decreases more rapidly than curve I as the bias current value increases. The distortion factor in this case, as indicated by curve IV, is of much lower value than the curve III.

Thus, as is apparent also from curves I and III, for example, as the bias current value increases, the distortion factor decreases, that is, the distortion characteristic improves, but the reproduction level decreases. For this reason, in order to achieve good recording and reproduction, the bias current value must be so selected that both the reproduction level and the distortion factor can be satisfied at the same time.

Moreover, these frequency characteristic and distortion factor characteristic differ with differences such as differences in the kind of the magnetic material of the magnetic tape, in the thickness of the magnetic medium, and in state of contact between the magnetic head and the magnetic tape.

Accordingly, in the system of the present invention, characteristics such as the above mentioned frequency characteristic and distortion factor characteristic are automatically measured, and the bias current is automatically set at the most suitable value, as described hereinbelow in conjunction with FIGS. 2 through 5.

Figure 2:
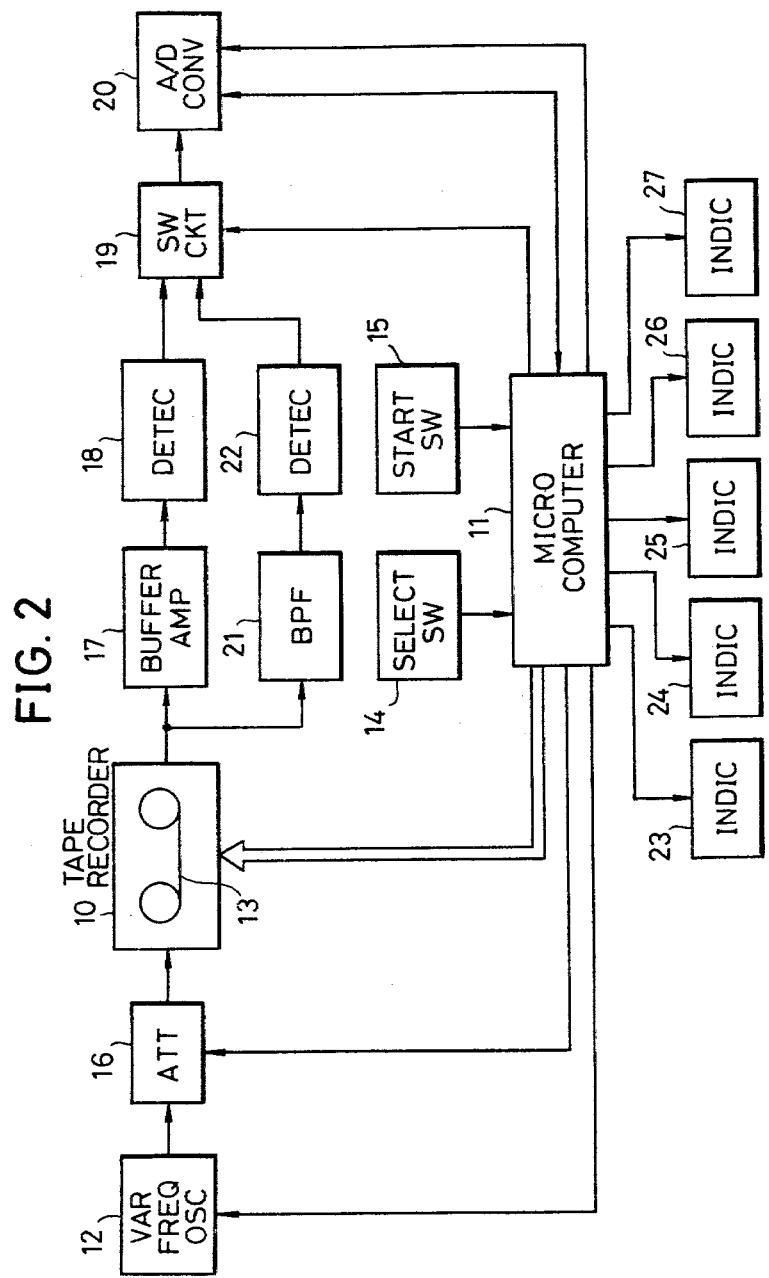
FIG. 2 is a block diagram of one embodiment of the bias current setting apparatus according to the invention in a magnetic recording and reproducing apparatus.

In the system shown in FIG. 2, a tape recorder proper 10 is controlled to operate in the recording mode or the reproducing mode by a computer 11. Prior to recording of an audio signal, the tape recorder 10 records and reproduces signals of specific frequencies from a variable frequency oscillator 12 on and from a magnetic tape 13. For the computer 11, a microcomputer constituted by a microprocesser of the stored program system is used.

The operation of the system illustrated in FIG. 2 will now be described with the aid of the flow chart diagram shown in FIG. 3. As mentioned hereinabove, the frequency characteristic and the distortion factor characteristic are of a nature such that improvements therein run counter to each other when the bias current is above a certain value. For this reason, under the hypothetic supposition of the worst condition, a signal for establishing the priority of either of the above mentioned two characteristics is introduced by a selection switch 14 as input into the computer 11.

Next, by closing a start switch 15 (which action is designated by process 30 in FIG. 3), the operation of the system is started. At this time, the computer 11 sets the bias current at the minimum value at process 32 in FIG. 3 and, at the same time, sets a parameter N=0 at process 32 in FIG. 3. The bias current value is varied in steps of 10 percent within a definite range, for example, within a range of ±30 percent with respect to a reference set value, and the operation starts from the initial setting of −30 percent.

The computer 11 controls the oscillation operation of the variable frequency oscillator 12, which accordingly produces as an oscillation output in a time-divisional manner a signal of a unit frequency of 1 KHz and a signal of a unit frequency of 10 KHz, for example. This oscillation output signal is attenuated to −20 VU by an attenuator 16 and recorded by a recording head on the traveling tape 13 at process 33 in FIG. 3. The signal thus recorded is immediately reproduced by a reproducing head at process 34 in FIG. 3.

The signal thus reproduced, on the other hand, is supplied by way of a buffer amplifier 17 to a detection circuit 18, where it is subjected to envelope detection. Furthermore, the reproduced signal, on the other hand, is supplied to a band-pass filter 21, by which a compenent thereof of 3 KHz and frequencies in the vicinity thereof are extracted. The resulting output signal of the band-pass filter 21 is supplied to a detection circuit 22, where it is envelope detected. The output signals of the detection circuits 18 and 22 are supplied to a switching circuit 19.

The switching circuit 19 is controlled in its switching operation by the computer 11 and, accordingly, passes selectively the output signal of the detection circuit 18 and supplies the same to an analog-to-digital (A/D) converter 20. From the A/D converter 20, digital signals responsive to the frequencies and levels of the reproduced signals of 1 KHz and −20 VU and 10 KHz and −20 VU are successively obtained and supplied to the computer.

Figure 3:
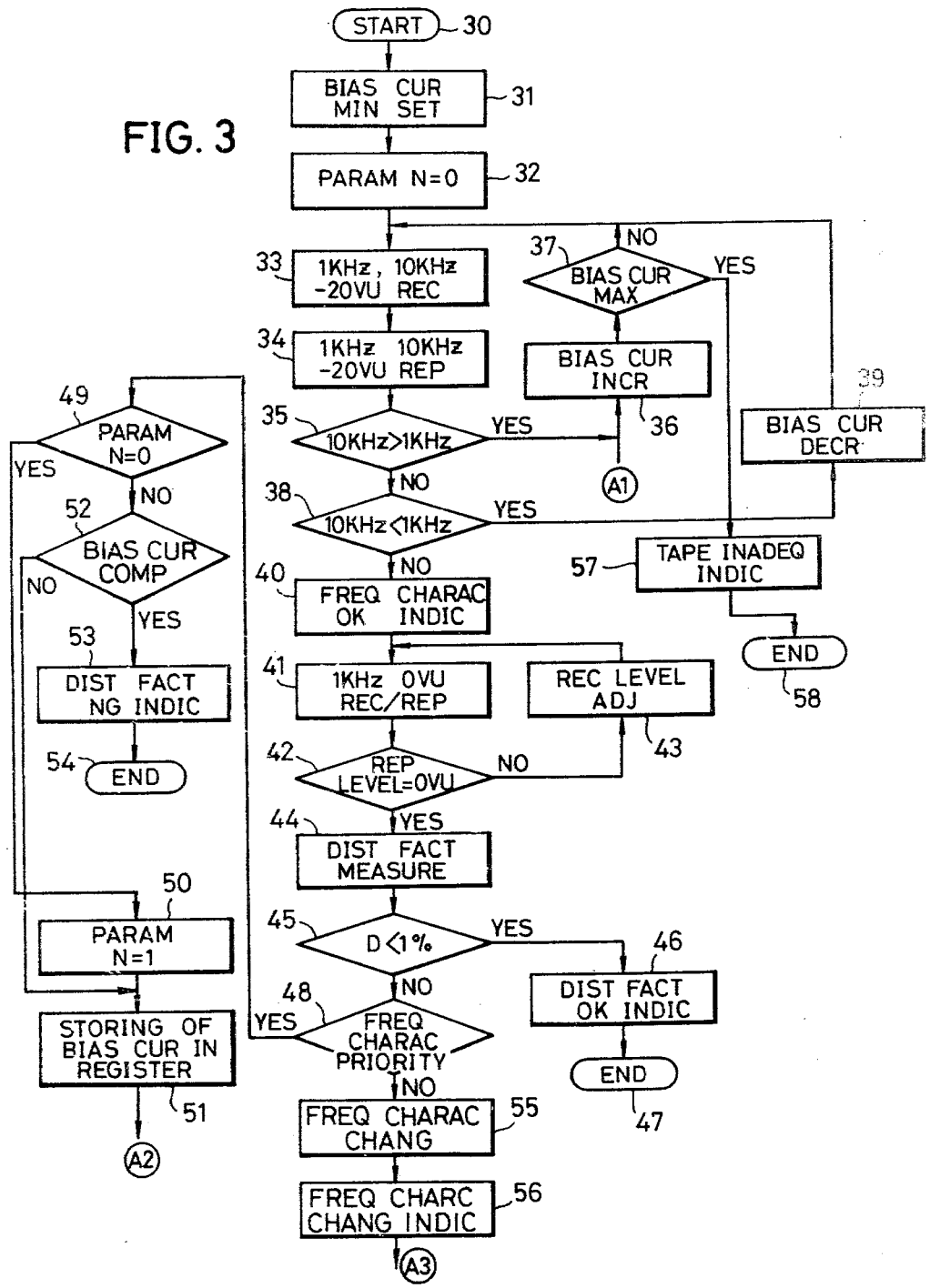
FIG. 3 is a flow chart for a description of the operation of the apparatus shown in FIG. 1.

In the case where the computer 11, as indicated at decision 35 in FIG. 3, judges or decides that the reproduced output level signal of 10 KHz from the A/D converter 20 is higher than the reproduced output level signal of 1 KHz with respect to a predetermined standard specification, it is decided to be higher, the computer 11 controls the bias current varying circuit within the tape recorder in a manner to increase the bias current value by a 10 percent step as indicated at decision 36 in FIG. 3. The computer 11 then decides whether or not the bias current thus increased is at its maximum value as indicated at decision 37 in FIG. 3. If the bias current has not reached its maximum value, the computer 11 causes the above described recording and reproducing operation to be carried out again.

In the case where the computer 11 determines that the level of the reproduced output signal of 10 KHz from the A/D converter 20 is lower than the level of the reproduced output signal of 1 KHz, as indicated at decisions 35 and 38 in FIG. 3, it causes the bias current to be reduced by a 10-percent step as indicated at process 39 in FIG. 3. In this manner, the above described operation is repeated until the level of the above mentioned 10 KHz reproduced output and level of the 1 KHz reproduced output mutually coincide or until they fall within the predetermined standard specification of the frequency characteristic. When the two reproduced output levels coincide or fall within the predetermined standard specification, the fact that adjustment relative to the frequency characteristic has been accomplished is indicated by a frequency characteristic "OK" indicator 23 as indicated at process 40 in FIG. 3.

Next, the variable frequency oscillator 12 is controlled by the computer 11 to produce as output a signal of a single frequency 1 KHz. This output signal is rendered by the attenuator 16 into a signal of 0 VU, which is the reference level, and is recorded on and reproduced from the magnetic tape 13 in the tape recorder 10 as at process 41 in FIG. 3. At this time, the computer 11 decides whether or not the reproduced output level is equal to 0 VU, as at decision 42 in FIG. 3, and carries out adjustment of the recording level of the tape recorder 10 so that it becomes 0 VU, as at process 43 in FIG. 3.

In general, during magnetic recording and reproducing, a nonlinearity thereof gives rise to the generation of a third harmonic component. Accordingly, in a reproduced signal of 1 KHz and 0 VU, a signal component of 3 KHz, which is the third harmonic component thereof, is included. This signal component of 3 KHz is taken out by the band-pass filter 21 and subjected to envelope detection by the detection circuit 22. During this operation, the switching circuit 19 is so controlled and switched by the computer 11 as to supply the output signal from the detection circuit 22 to the A/D converter 20. The computer 11 measures the distortion factor D as indicated at process 44 in FIG. 3 from the ratio of the detection output level of the third harmonic component within the reproduced signal and the 1 KHz reproduction level (0 VU) represented by the output digital signal from the A/D converter 20. As indicated at decision 45 in FIG. 3, the computer 11 decides whether or not the value of the distortion factor D thus measured is within a standard specification (for example, 1 percent). When the result of this decision is "YES", it is indicated by a distortion factor "OK" indicator 24 as indicated at process 46 in FIG. 3.

As a result of the above described operation, the most suitable bias current value is automatically set on the magnetic tape 13, whereupon the setting operation is completed as indicated at end state 47 in FIG. 3. Immediately thereafter, or after the portion of the tape which has been required for the above described recording and reproducing has been rewound, the tape recorder starts its ordinary recording operation to record the desired audio signal on the magnetic tape 13.

In the case when the result of the decision as indicated at decision 45 in FIG. 3 is "NO", that is, in the case where the distortion factor D is greater than the standard specification value, the succeeding frequency characteristic priority decision indicated at decision 48 is carried out. As described hereinbefore, as a result of the manipulation of the selective switch 14, the presetting of the priority of either the frequency characteristic or the distortion factor characteristic is determined. Accordingly, in the case where the priority of the frequency characteristic has been determined beforehand, the result of decision at the decision 48 in FIG. 3 is "YES", while, in the case where the priority of the distortion factor characteristic has been determined, the result of decision as indicated at the decision 48 is "NO".

Then, in the case where the priority of the frequency characteristic has been selected beforehand, the decision of whether or not the parameter N is zero is carried out at the decision 49 in FIG. 3. In the case where the decision result is "YES", the parameter N is made equal to one (unity) as indicated at step 50, and the bias current value is stored in a register as indicated at process 51. At the same time, as indicated through lines Az and A1, the bias current value is increased as indicated at process 36. Whether or not the bias current is of the maximum value of the standard specification is determined at the decision 37. In the case where the result of this decision is "NO", an operation for placing the above mentioned frequency characteristic within the standard specification is carried out. Thereafter, the distortion factor D is again measured. In the case where the result of decision at the above mentioned decision 45 is "YES", the distortion factor "OK" indication is displayed similarly as described above, and the operation is completed.

However, in the case where the result of decision at the decision 45 is "NO", since the parameter N is one (unity), the result of decision at the decision 49 is "NO", and the bias current value stored in the above mentioned register and the present bias current value are compared at decision 52. When the two values are not equal, the above described operation of placing the frequency characteristic and the distortion factor characteristic within standard specifications is again carried out. On the other hand, when the bias current value becomes the upper limit of the previously determined frequency characteristic range, and the stored bias current value and the present bias current value become equal, the result of decision at decision 52 is "YES". As a result, the fact that the distortion factor is of a value outside of the standard specification of the distortion factor characteristic is indicated by a distortion factor "NG" indicator 25 as shown at process 53, and the operation is ended as indicated at end indication 54.

On the other hand, in the case where the priority of the distortion factor characteristic has been previously selected, the standard specification of the distortion factor is left as it is, and only the standard specification of the frequency characteristic is made inferior to the present standard specification. More specifically, in the case of priority of the distortion factor characteristic, the result of decision at decision 48 is "NO". When the standard specification range of the frequency characteristic in this case is, for example, ±1 dB, this is broadened to ±2 dB, for example (as indicated at process 55 in FIG. 3), and the change in the standard specification of the frequency characteristic is indicated by an indicator 26 (as shown at process 56 in FIG. 3). Simultaneously, as indicated through lines A3 and A1, the bias current value is increase by a 10-percent step similarly as described hereinbefore (as at step 36), and the frequency characteristic is placed within the standard specification range after change by the same method as described above. Thereafter, recording and reproducing of the signal of the level 0 VU and the frequency of 1 KHz is carried out, and the distortion factor D is again measured. If the distortion factor falls within the standard specification range, and indication of distortion factor "OK" is carried out by the indicator 24.

However, in the case where the above described operation is repeated, and the distortion factor D does not fall within the standard specification range even when the bias current value reaches the maximum value of the standard specification, the decision result at decision 37 becomes "YES", the fact that the use of the magnetic tape 13 of this kind in this tape recorder 10 is unsuitable is indicated by an indicator 27 as indicated at process 57 in FIG. 3, and the operation is ended as indicated at end indication 58. In this case, the magnetic tape 13 is replaced by a magnetic tape of another kind, or, by placing the bias current setting system of the present invention in its inoperative state, recording is carried out in the conventional manner with the originally set bias current value.

By the above described operation of setting the most suitable bias current value, the bias value and the information of the indication states of the indicators are stored in the computer 11, and the bias current at the time of subsequent recording operations of the tape recorder 10 is always maintained at the most suitable value. This bias current is maintained at the most suitable value even when the recording operation is again resumed after the power source has been once cut off because of a non-volatile memory or the use of a battery.

Figure 4:
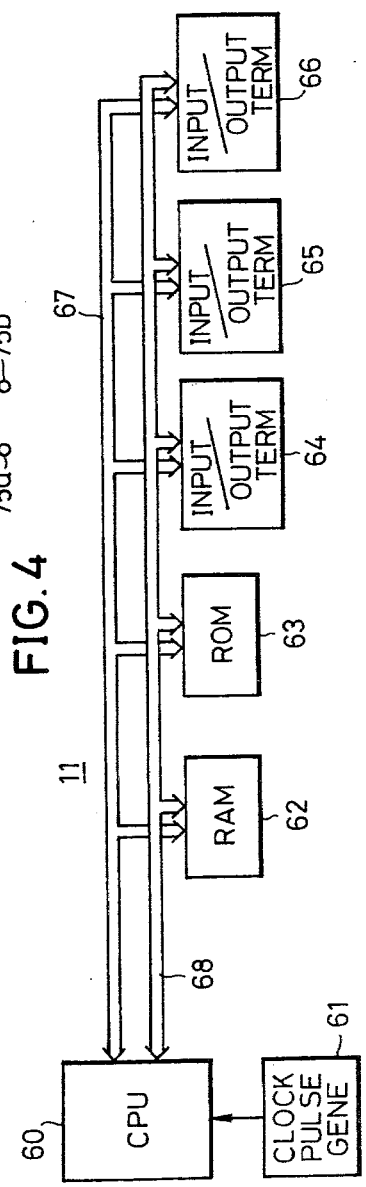
FIG. 4 is a block diagram of one example of a computer used in the apparatus illustrated in FIG. 1.

A block diagram of one example of the computer 11 is shown in FIG. 4. In this computer a central processor or central processing unit (CPU) 60 is supplied with clock pulses from a clock pulse generator 61. A random access memory (RAM) 62 and a read-only memory (ROM) 63 for storing a planned systematic program are ordinarily made as a pattern at the time of production of a large-scale integrated circuit (LSI). Input/output terminators 64, 65, and 66 are used respectively for interfaces with the tape recorder 10, the variable frequeny oscillator 12, and the A/D converter 20. Between these and the CPU 60, data signals of 4 bits or 8 bits are sent and received through a data bus 67. Furthermore, address signals of 4 bits or 8 bits are sent, received, and transferred through an address bus 68. In the present embodiment of the invention, a microcomputer of one-chip type in which the circuit shown in FIG. 4 is integrated into a unitary structure is used.

Figure 5:
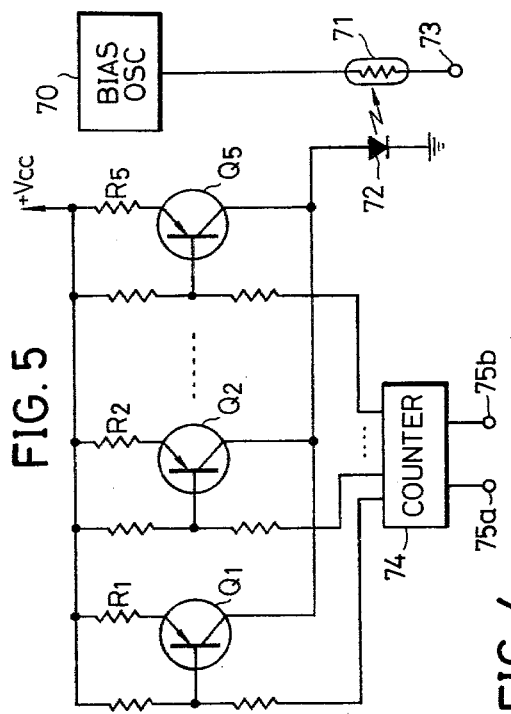
FIG. 5 is a circuit diagram of an embodiment of a bias current varying circuit.

One example of practice of a bias current varying circuit within the tape recorder 10 controlled by the computer 11 will now be described in conjunction with FIG. 5. In the path of a bias current from a bias oscillator 70, a light-receiving element 71 whose electrical resistance is changed by light, such as cadmium sulfide (CdS) is connected. A light-emitting element 72 such as a light-emitting diode (LED) is provided to face the light-receiving element 71. The collectors respectively of transistors Q1 through Q5 are commonly connected to the light-emitting element 72. Furthermore, resistors R1 through R5 respectively of different resistance values are respectively connected between a power source +Vcc and the emitters of the transistors Q1 through Q5. In the present example of practice, the resistance values of the resistors R1 through R5 are successively doubled in the order stated. The bases of the transistors Q1 through Q5 are connected to a counter 74.

This counter 74 has a reset pulse input terminal 75a and a count pulse input terminal 75b both connected to the computer 11. The counter 74 counts the pulses sent serially from the computer 11, and the value thus counted is produced as output at output terminals connected to the bases of the transistors Q1 through Q5. For example, when three count pulses are sent, the outputs of the counter 74 become 1, 1, 0, 0, 0. The transistors Q1 through Q5 are controlled by the output of the counter 74, whereby the current flowing through the light-emitting element 72 is controlled, and the quantity of light emitted is varied. This variation causes the resistance value of the light-receiving element 71 to vary, whereby the value of the bias current applied to the recording head through a terminal 73 is varied.

While, in the setting of the most suitable bias current according to the flow chart shown in FIG. 3, the frequency characteristic is first caused to fall within a specific standard specification, the operational procedure and system thereof is not thus limited, and the system may be so adapted as to carry out an operation wherein the distortion factor characteristic is first caused to fall within the standard specification, and then the frequency characteristic is caused to lie within the standard specification.

Furthermore, in the above described embodiment of the invention, signals of two frequencies are generated in a time-divisional manner by using a single variable frequency oscillator 12, but the means for generating these signals is not thus limited. For example, an arrangement wherein two oscillators for generating, respecitvely, signals of 1 KHz and 10 KHz are used to record and reproduce the signals of the two frequencies which have been frequency-multiplexed may be used. In this case, instead of the detection cirucit 18, two band-pass filters for respectively separating the signals of the two frequencies and two detection circuits for detecting the two frequency signals thus separated are used.

Furthermore, in the above described embodiment of the invention, the reference signal frequency is selected at 1 KHz, but the reason for this is that this frequency is one which covers the principal components of an audio signal and, in general, its mutual relationship with distortion as detected by the sense of hearing is great. However, the reference signal frequency is not thus limited to 1 KHz provided that the frequency of the third harmonic lies within the band of audible frequencies.

Further, this invention is not limited to these embodiments but various variations and modifications may be made without departing from the scope of the invention.

What is claimed is:

1. A bias current setting apparatus for use in a magnetic recording and reproducing apparatus having a bias current supplying means and means for recording an audio signal with the bias current on a magnetic tape, said bias current setting apparatus comprising: oscillation means for oscillating signals of different frequencies, said signals of different frequencies being recorded and reproduced on and from the magnetic tape in the magnetic recording and reproducing apparatus;
means for varying the current value of the bias current;
a first detecting means for detecting the signals of different frequencies which have been recorded and reproduced;
means for separating a harmonic component of the signal of a frequency which have been recorded and reproduced;
a second detecting means for detecting the output signal of the separating means;
means for converting the output signals of the first and second detecting means which have been selectively supplied thereto into digial signals; and
a computer for controlling the bias current setting means with a stored program system responsive to the digital signals supplied from the converting means thereby varying the bias current value and setting the same at a current value appropriate to the recording on the magnetic tape,
said computer varying and setting the bias current value so that the levels of the signals of different frequencies detected by the first detecting means fall within the predetermined frequency characteristic specification range and distortion factor measured responsive to the output signals of the first and second detection means fall within the predetermined distortion factor chatacteristic specification range, said bias current being resultingly set in correspondence with a kind of the magnetic tape.

2. The bias current setting apparatus as claimed in claim 1 in which said oscillation means comprises a variable frequency oscillator controlled by the computer and for oscillating the signals of different frequencies in time division.

3. The bias current setting apparatus as claimed in claim 1 in which said computer includes means for selecting and setting previously that which one of the frequency characteristic and distortion characteristic should preferentially fall within the predetermined specification range in a case where the levels of the signals of the different frequencies detected by the first detecting means do not fall within the predetermined frequency characteristic specification range or in a case where the distortion factor does not fall within the predetermined distortion factor characteristic specification range.

4. The bias current setting apparatus as claimed in claim 1 which further comprises means for indicating that the frequency characteristic or the distortion characteristic is out of the predetermined specification range, in a case where the levels of the signals of the different frequencies detected by the first detecting means do not fall within the predetermined frequency characteristic specification range or in a case where the distortion factor does not fall within the predetermined distortion factor characteristic specification range.

5. The bias current setting apparatus as claimed in claim 1 in which the bias current value varying means comprises a light-emitting element of which the emitted light quantity is controlled by signals from the computer and a light receiving element of which resistance value varies responsive to the quantity of the light from the light-emitting element, said light receiving element being connected in the flowing path of the bias current.

6. The bias current setting apparatus as claimed in claim 1 in which a frequency lower than the other frequency out of said different frequencies is approximately 1 KHz, and said separating means separates a frequency component of approximately 3 KHz.

* * * * *